March 12, 1963 W. DIETRICH 3,081,444

AUTOMATIC CHARACTER-RECOGNITION METHOD AND ASSOCIATED ARRANGEMENT OF APPARATUS THEREFOR

Filed Oct. 9, 1959 2 Sheets-Sheet 1

INVENTOR.
W.DIETRICH

BY Robert Harding Jr.

ATTORNEY

INVENTOR.
W. DIETRICH

BY Robert Harding Jr.
ATTORNEY

United States Patent Office 3,081,444

Patented Mar. 12, 1963

3,081,444

AUTOMATIC CHARACTER-RECOGNITION METHOD AND ASSOCIATED ARRANGEMENT OF APPARATUS THEREFOR

Walter Dietrich, Ditzingen, Kreis Leonberg, Germany, assignor to International Standard Electric Corporation, New York, N.Y., a corporation of Delaware Filed Oct. 9, 1959, Ser. No. 845,453
Claims priority, application Germany Oct. 15, 1958
10 Claims. (Cl. 340—146.3)

Figure 1:
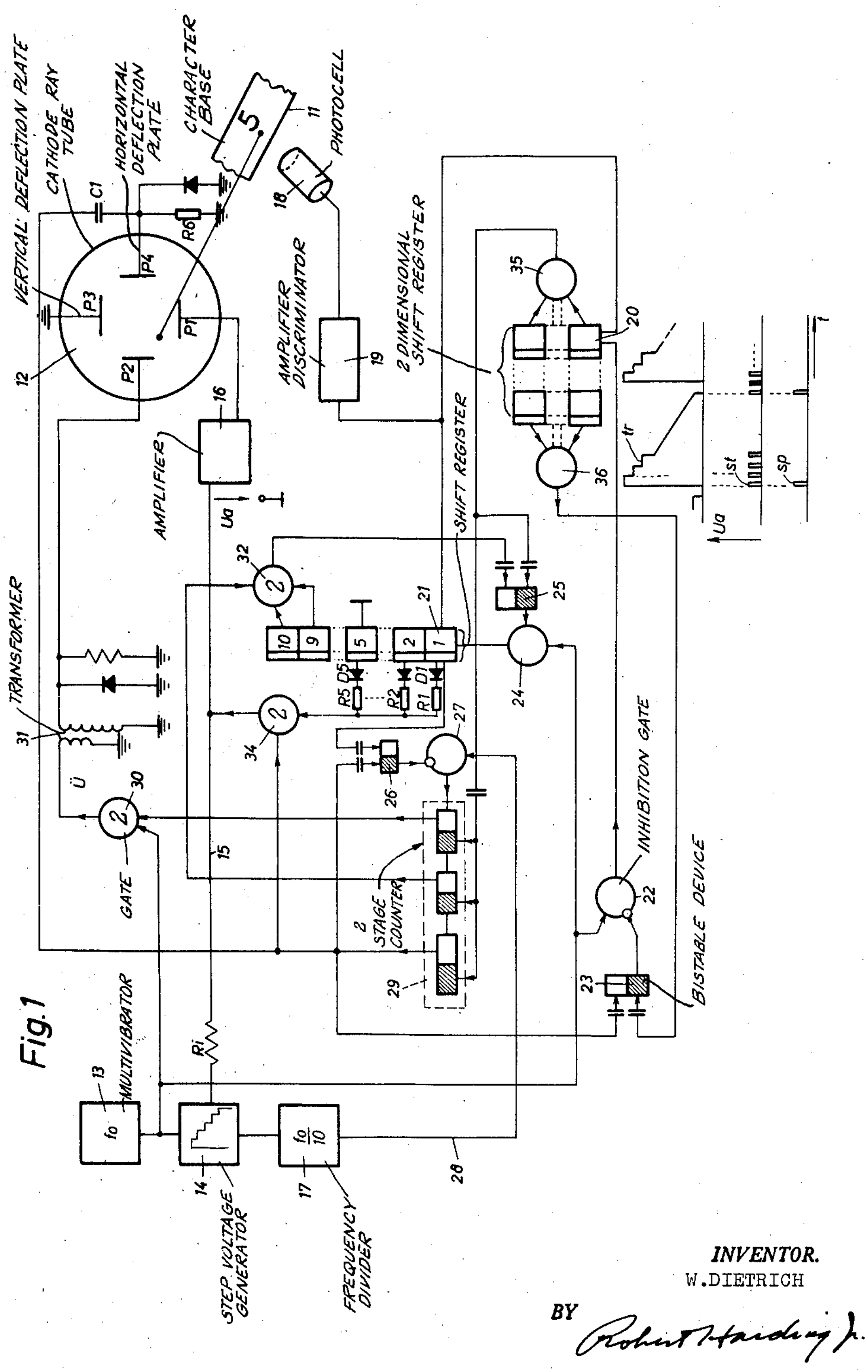

The present invention relates to a method and an associated arrangement of apparatus for the automatic recognition of characters.

Among the numerous conventional automatic character-recognition methods employing various evaluation principles one has become well known in which the characters are divided in a raster-shaped pattern. To this end a plurality of photocells is provided, of which one is assigned to each point of the raster (scanning pattern). It is then possible to recognize the character, which is imaged on the photocell pattern in accordance with the combination of exposed and non-exposed photocells within evaluating circuit connected thereto. In order to facilitate the scanning, a row of photocells may be provided corresponding in number to the number of raster fields per column or row respectively, and the row of photocells and the character field may be displaced in relation to one another. Finally, it is possible to go one step further and scan the entire character field with a single photocell, which is moved over the character field. This scanning may be realized simply by scanning the character with a cathode ray as in the ordinary television raster. The light reflected by the scanned character base, impinges on the photocell, and the electric signals produced by the photocell are stored and fed to a recognizing circuit. In the course of this it is still necessary to quantize the electric signals in order to distinguish solely between "black" and "white" values during the scanning process, so that the evaluating circuit can be simplified.

Accordingly, during the scanning of a character field by means of a cathode ray, it can be determined whether the field, along certain scanning lines, is provided with black markings at predetermined points. In the course of this it is not necessary for the character field to be symmetrically rastered, in other words for the field to be provided with an equal number of raster elements in the row and column directions.

Finally it is possible to direct the cathode ray along the scanning rows, and to count, in each row, the number of white-black or black-white transitions appear, independently of the locations of such transitions within the character field.

To provide sufficiently reliable character recognition, according to the row-scanning method, it is necessary to finely resolve the characters, that is, to provide many scanning rows. This, naturally requires a corresponding investment in additional scanning-, storing- and recognizing-circuits. This is rendered more difficult since the character resolution in the case of different size characters must be adapted to the size of the smallest characters to be resolved. Thus for recognizing a letter printed by a typewriter, if a resolution of 10 scanning rows, is required for the small letters, then the capital letters will have to be scanned with 15 rows since in the case of typewritten letters the capital letters are 1.5 times as large as the small letters. Accordingly, in general, more circuitry will be provided than is actually necessary for reliable recognition. For handwritten characters the adaptation is still more unfavourable since the same character may have quite different sizes. Thus for reliable recognition, not only must the number of the scanning rows be increased in accordance with the ratio of the largest to the smallest character size, but in addition the evaluating circuit must be designed to accommodate variations in size of the same character. This again requires a substantial additional investment.

The object of the invention is an automatic character-recognition method, operating with the aid of e.g. a column-wise scanning light-spot, which avoids these disadvantages.

The basic idea of the invention involves variation of the spacing between successive scanning rows, in dependency upon the size of the character, in such fashion that all characters receive the same number of row scans. To this end the height of the characters is determined during a previous scanning, and the voltage for the vertical deflection of the light spot is automatically changed in accordance with this previous height determination in such a way that the light spot, during the actual scanning operation, resolves capital and small characters with the same predetermined number of horizontal rows.

Appropriately, the previous scanning for height determination, is performed in such a way that the character is scanned by the light spot in a column-wise manner, until the light spot, for the first time, intercepts a part or portion of the character. During the next column scan a horizontal deflection extending over the entire or almost entire width of the character is superposed in each row. The number of rows containing black intelligence is determined, and the horizontal deflecting voltage is varied in accordance with the size of the respective character.

For carrying out the height determination of the previous scanning, a shift register may be used comprising a number of storage cells corresponding to the number of scanning rows, in which for each scanning row, in the presence of a brightness variation exceeding a predetermined value, a one signal is stored. Furthermore controlling and switching means are required for producing the row-rastering for each scanning column, as well as for controlling the horizontal deflection of the light spot. Finally, means which are connected to the outputs of the shift-register stages and which, in dependency upon the respective circuit conditions of these stages, act upon the vertical deflecting voltage, in the sense of effecting a reduction are required. For producing the row frequency $f_0$, a multivibrator may be used. From this frequency, and with the aid of a frequency divider, the column frequency $f_0/n$ may be desired. In order to obtain the row-rastering pattern during the vertical movement of the light spot, it is appropriate to produce a so-called step-voltage of the frequency $f_0/n$, the steps of which correspond to the spacing of the rows, that is, have the frequency $f_0$. Accordingly, the period of the step-voltage corresponds to one scanning column. For synchronization, in other words, for producing the scanning columns during the continuous movement of the character base past the cathode-ray tube, so-called step or column pulses, following each other with the frequency $f_0/n$, are used.

Furthermore, a counting device is used for controlling the previous scanning. It is stepped-on by the column pulses, and consists of three flip-flop stages, the first of which, upon arrival of the first storage pulse in the testing column, consisting of the aforementioned shift register, is prepared and, by the next-successive column pulse, is marked and, thereby, effects the application of the horizontal deflecting voltage to the corresponding deflecting plates. The second stage of this counting device is marked by the next successive column pulse; the horizontal deflection being again interrupted, while the third stage, which is marked during the next column pulse, effects on one hand the reading of the testing column and, on the other hand, the stoppage of the counter.

For reading the testing column an output resistance is assigned to each of said stages, and which in the unmarked condition of the respective stage, is connected as a voltage-dividing resistance to the internal resistance of the deflecting generator for producing the vertical deflecting voltage. In this arrangement the resistance values are so dimensioned that upon insertion of a resistance the deflecting voltage $U_a$ is reduced by $1/n$ of its open-circuit value.

In order to obtain an exactly defined starting point for the reading of the testing column the stored informations are displaced in the rhythm of the multivibrator until the first storage, resulting from the horizontal scanning, has reached the top stage of the testing column.

The determination of the deflecting voltage with this arrangement bears the considerable advantage that exclusively ohmic resistors can be used; that is, linear and constant circuit elements.

The evaluation of the signals obtained in the course of the actual scanning operation devoted to character recognition, can be carried out with conventional evaluating circuits. Appropriately, a two-dimensional shift register is used, and to the outputs of the stages thereof are connected the coincidence circuits by means of which character-recognition is achieved.

Figure 2:
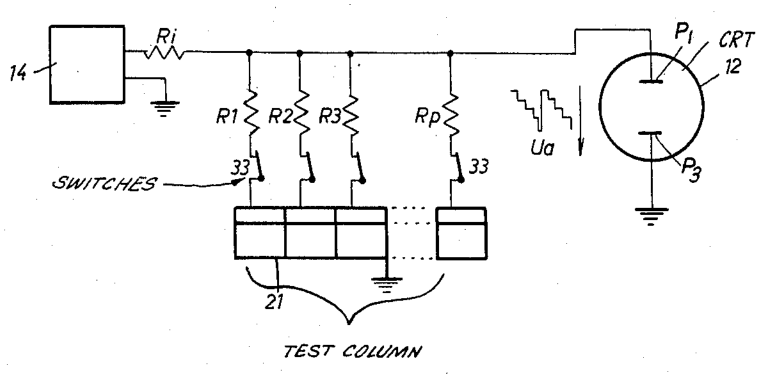
Figure 3:
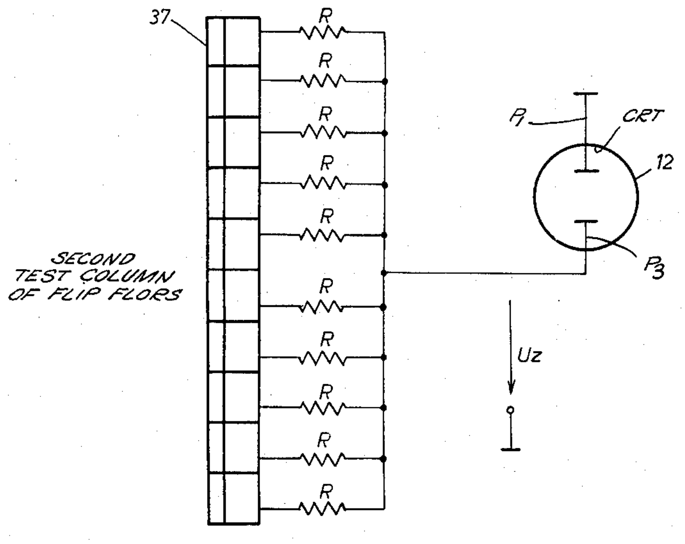

The above-mentioned and other features and objects of the invention and the manner of attaining them will become more apparent and the invention itself will be best understood by reference to the following description of an embodiment of the invention taken in conjunction with the accompanying drawings wherein:

FIG. 1 shows a circuit arrangement for determination of character height according to the invention, FIG. 2 shows the testing column of FIG. 1 to clearly show determination of the deflecting voltage $U_a$, FIG. 3 shows a circuit arrangement for centering a character via a cathode-ray tube scanning.

Referring now to FIG. 1 there is shown a circuit arrangement which is suitable for the previous and for the main scanning of the character field, which scanning, in the present example, is effected in a column-wise manner. The cathode ray tube for the scanning of the character base 11 is symbolically represented by the circle 12. The pair of plates P1, P3 serve to produce the vertical, deflecting voltage and the pair of plates P2, P4 serve to produce the horizontal deflecting voltage.

In the course of the so-called previous scanning for determining the height of the character, the cathode ray is led in a columnwise manner, that is, orthogonally as in the case of a television raster, over the character base. For producing the deflecting voltage, a multivibrator 13 is provided, the frequency of which is assumed to be $f_0$. The output pulses of the multivibrator are fed to a step-voltage generator 14, adapted to produce a step-like voltage *tr*. This step voltage has a frequency $f_0/n$, and the steps *st* of the step voltage have a frequency $f_0$. In the present example it is assumed that $n=10$. The step voltage is applied via the line 15 and amplifier 16 to the deflecting plate $P_1$. The frequency divider 17 further delivers column pulses *sp* with the frequency $f_0/10$.

The mode of operation of the previous scanning is as follows: the character base 11 is continuously led past the cathode-ray tube 12. The step voltage which is applied to the deflecting plate $P_1$ effects a step-by-step deflection of the cathode ray from top to bottom, thereby defining the row-rastering pattern. In the course of this scanning operation the remaining circuit of FIG. 1 remains ineffective.

The screen of the cathode-ray tube serves as a light source for the scanning of the character base 11; the light as reflected by the base is collected by the photocell 18. In this arrangement, the photocell the amplifier 19 which, simultaneously, acts as an amplitude discriminator in such a way that at the output digitalized electric signals are produced, (that is, an output signal will only be produced when the scanned area exceeds a predetermined black-value). These output signals are then applied to the two shift registers 20 and 21. The latter, which will be referred to as the test column, serves to determine the height of the character during the previous scanning. During this period the shift register 20 will remain blocked since the row pulses of the multivibrator 13 are prevented from passing through the gate 22. This is due to the fact that the flip-flop 23 is in the initial inhibiting position. However, the row pulses as produced by the multivibrator 13, are permitted to pass the gate 24, since this gate is open because of the flip-flop 25. On account of this the signals passing through amplifier 19, can be stored in the test column 21.

When the cathode ray sweeps over the first bright dark variation of the character base, a pulse will reach the stage 21/1 of the test column 21. The stage 21/1 will then be triggered by the row pulse as produced by the multivibrator 13, and arriving from the gate 24; thereby transferring a pulse to the flip-flop 26, and opening the gate 27. Thus the next successive column pulse, over the line 28 and via the gate 27 can approach the three-stage decade counter 29, and set it into the counter-position "1." On the next column pulse the gate 30 will be opened, so that the row pulses from the multivibrator 13 can be applied via the transformer 31, to the plate $H_2$ of the cathode-ray tube, and thereby deflect the cathode ray in the horizontal direction. The row pulses are so dimensioned that the deflection is effected approximately over ¾ of the normal width of the characters, so that the top and bottom contours of the characters will be relatively intercepted, but the starting contours of a following character will not.

Accordingly, the deflection of the cathode ray from top to bottom is now superposed in each stage, that is, in each row, by a horizontal deflection, so that during one period of the step voltage the entire area of the character will be scanned. Each time a horizontal deflecting point intercepts a brightness variation for the first time, a pulse will be stored in the test column 21. These will be passed on in the rhythm of the row pulses as provided by the multivibrator 13.

The previous scanning is terminated by the next successive column pulse, in other words, as soon as the cathode ray has undergone the tenth horizontal deflection. This second column pulse steps the counter 29 into the position "2," so that the gate 30 will be closed or blocked again and, consequently, a deflecting voltage will no longer be applied to the plate $P_2$.

Subsequently to the termination of the previous scanning; the information, as stored in the test column 21, will be displaced or shifted until the first pulse originating from the horizontal deflection, will have reached the stage 21/10. The size of the character is identified by the number of marked stages of the test column.

If the counter 29 has assumed the position "2," then the gate 32 will be opened, so that upon coincident marking of the two top stages of the test column 21, a pulse will be applied via the gate 32, to the flip-flop 25 which is triggered into its other stable condition, thus blocking the gate 24. Thus no further row pulses can be applied to the test column 21 and, consequently, the stored informations can no longer be passed on.

To explain the mode of operation of the test column 21, in determining the size of the character, details of this test column 21 are shown schematically in FIG. 2. Subsequent to the previous scanning the number of stages marked in the test column correspond to the size of the character in the vertical direction. All other stages will remain unmarked. In the non-marked condition the switches 33 are closed, so that the associated resistors $R_{1 \ldots p}$ are connected to the step-voltage generator 14. The connected resistors $R_{1 \ldots p}$, together with the internal resistance $R_i$ of the generator 14, form a voltage divider, so that the output voltage $U_a$ will be correspondingly reduced. If, for example, the character is so large that it covers all horizontal scanning rows, then all stages of the test column 21 are marked, and consequently all resistors $R_{1 \ldots p}$ are disconnected from the generator voltage; accordingly, the voltage $U_a$ assumes its highest value. However, if the scanned character is so small that it only covers half of the scanning rows, only half the number of resistors $R_{1 \ldots p}$ are connected. The resistances are so dimensioned that the voltage $U_a$ will then drop to one half (the resistors $R_{1 \ldots p}$ are of different values). In order to properly dimension the values of the resistors, and to connect the proper resistors to the voltage $U_a$, irrespective of where in the test column the black-pulses are stored, the informations are shifted, subsequent to the termination of the previous scanning, to the upper end of the test column.

This arrangement for the determination of the voltage $U_a$ provides a substantial advantage in that the size or magnitude of the deflecting voltage is set exclusively linear and constant circuit elements.

The test column 21 is provided with just as many stages as there are scanning rows; in the present example 10 stages. Assuming that the size of the character varies in the ratio 2:1, then it is sufficient to connect one resistor to each of the stages 21/1–21/5 on the lower half of the test column. The diodes $D_1$ through $D_5$ in FIG. 1 provide mutual decoupling of the outputs of the individual stages of the test column and take over the function of the switches 33 shown schematically in FIG. 2. Accordingly, the diodes $D_1 \ldots D_5$ are connected in such a way to the outputs of the stages (their anodes lie on zero potential) that they will insert their associated resistances whenever the stage is unmarked. In the marked condition the anodes of the diodes are applied to a suitable negative potential. When the gate 34 is opened a number of resistors, $R_1 \ldots R_5$, corresponding to the stages of the test column 21 are inserted in the voltage divider. If, for example, the lowest or bottom stage is unmarked, then the resistor $R_1$ will be inserted. This resistor is so dimensioned that it, via the voltage divider $R_i$; $R_1$, will reduce the deflecting voltage $U_a$ by 10%, but in the course of the following main scanning operation, the character will still be resolved into 10 rows. In cases where the character is still smaller, further resistors are connected in parallel with the resistor $R_1$. Each additionally inserted resistor reduces the voltage $U_a$ by $1/10$ of its open-circuit value.

The scanning operation is now continued, and at the next column pulse the third stage of the counter 29 (FIG. 1) will be marked. Because of this the gate 34 will be unblocked and those of the resistors $R_1 \ldots R_5$ whose stages are unmarked will be connected or applied to the deflecting voltage $U_a$. Furthermore, via the marking of the third stage of the counter, the flip-flop 26 will be restored to its initial condition, and consequently the gate 27 will remain blocked, so that the counter 29 will come to a standstill.

Furthermore, the marking of the third stage of the counter indicates a pulse which is applied to the deflecting plate $P_4$ of the CRT 12, via the capacitor C1. This pulse causes the light spot to be shifted two columns to the left so that the following main scanning will commence at the front edge of the character. The timing circuit $C_1.R_6$ is so dimensioned that the voltage at $R_6$ will have decayed after the character has been scanned. The voltage at $R_6$, in the present example, has an exponential curve which, if so required, may be linearized with the aid of conventional means.

Finally, the marking of the third stage of the counter 29 reverses the flip-flop 23 opening, the gate 22 and allowing the row pulses from the multivibrator 13 to be applied to the two-dimensional shift register 20. Thus the signals appearing in the course of the following main scanning operation can now be stored in this shift register. During the main scanning the characters are likewise scanned from top to bottom in a column-wise manner.

The step voltage taking care of the row-wise rastering (resolution). The step voltage is applied between the plates P1 and P3; in this case and the cathode ray is only deflected in the vertical direction. For the horizontal resolution of the character in this case, a movement of the character base in the horizontal direction is utilized.

Of course, the scanning operation may also be carried out with the aid of other types of conventional means.

Subsequent to the scanning operation, the character is electrically simulated by the condition of the individual storage cells within the shift register 20.

After the character is completely scanned, and the corresponding signals are stored in the shift register 20, at least one vertical scanning will yield exclusively "white" intelligence, so that also the first (right-hand) column of the shift register will contain only white-informations. This criterion is utilized for sending, via the gate 35, a restoring signal to the counter 29. By the restoring of the counter 29 the gate 34 will be reblocked, so that the deflecting voltage $U_a$ will reassume its initial value. The output signal of the gate 35 is likewise applied to the flip-flop 25 which is triggered back into its initial position, and opens the gate 24. On account of this the row pulses are again permitted to reach the test column 21, and to shift out the informations as contained in the shift register. In the shift register 20 the character is shifted until it reached the position where the recognizing circuit is connected. Thereupon, and via the gate 36, a pulse is applied to the flip-flop 23, which is thus triggered back to its initial position and reclosing the gate 22, so that now no further row pulses can be applied to the shift register 20, and the stored information will remain in this position.

The entire circuit arrangement has now reassumed its initial position and is ready for the scanning of the next character.

In the present description it was assumed that the characters may vary with respect to height, but are otherwise properly centered, that is, that the scanning always takes place within a predetermined section of the picture screen of the cathode-ray tube. Of course, the centering may be effected in the shift register 20, but in this connection the danger exists that a small character, standing at the upper or lower edge of the scanning field, will not be completely scanned after the scanning height has been reduced by the expansion method described. For this reason it appears to be appropriate to carry out the centering together with the previous scanning, since the investment in circuitry will be reduced, and the circuit arrangement according to FIG. 1 can be used for the previous scanning as well as for centering.

In FIG. 3 there is shown an arrangement for adapting the scanning to the vertical position of the character within the scanning field (centering) with the aid of the described previous scanning operation.

The characters are previously scanned in the described manner to determine the size thereof. In accordance with this previous scanning the storage elements of the second test column 37 are also either marked or non-marked. From FIG. 3 it will be seen that with respect to the upper half of the storage elements the resistors R are applied to the left-hand collectors of the flip-flops, while with respect to the lower half they are connected with the right-hand collectors. When the character is lying in the center, the upper and the lower half of the test column 37 have an equal amount of flip-flops in the position "on"; and it may thus be assumed that $U_z=0$. If the character is not lying in the center of the scanning field then the information will be correspondingly stored in the test column 37, and a direct voltage $U_z$ will be provided which, according to magnitude and sign, represents the deviation of the character from center. Accordingly, the information as stored in the test column 37, is not shifted to the one end of the test column, as it is in the case of the described expansion method, but it remains stationary, in those storage cells which correspond to the height position of the character within the scanning field, until after the termination of the main scanning operation. Thus the centering voltage $U_z$ can be used for deflecting the electron ray, during the main scanning process, to that particular point of the scanning field where the character is located.

This method provides the advantage that the centering of the electron beam can be effected with the aid of ohmic resistors, hence with linear and constant circuit elements. The centering may also be carried out symmetrically on both plates, in that twice five or twice ten resistors are used. However, the production of an asymmetric centering voltage $U_z$ as described hereinbefore, bears the advantage that the decoupling from the step voltage $U_a$ is effected by the cathode-ray tube, and that therefore no additional circuit arrangement is required since $U_a$ is likewise applied in an asymmetrical manner to the other plate serving the vertical deflection.

It has also been proposed to carry out centerings on the cathode-ray tube during the character recognition, but the conventional methods are much more unreliable than the employment of the row expansion according to this invention.

In the described arrangement the scanning height is always made equal to the character height. In the case of handwriting, where the same character varies with respect to its height, this method represents the optimum as far as the recognizing reliability and the investment in circuitry (for both the storage and the recognizing circuit) is concerned. In the case of type-written letters, where only a ten characters have a defined difference in size it is well justified to regulate the scanning operation approximately whereby it is dependent upon the height of the characters in an unambiguous correlation.

The circuit arrangement can be substantially simplified in that for both the expansion and the centering the same test column is used. Furthermore, the control circuit will then be reduced by one step in the counter 29, and by the circuit arrangement which is connected to stage 2 of this counter. Finally, instead of the non-uniform resistors $R_1 \ldots R_5$ 10 uniform resistors may then be used.

The misadaption of the scanning height to the character height will then, e.g. in the case of 10 scanning rows for one capital character, have the effect that a character which is smaller by 33% (corresponding to the difference between the capital and the small letters of the typewriter) will be scanned 9 rows instead of by 10. Within this order of magnitude the unreliability resulting in all point-scanning systems, due to the quantizing effect, must be remembered.

It is also possible to utilize the described expansion method for determining the width of a character. The device may be altered so that the resistors $R_1$–$R_5$ effect a change over of the frequency of the multivibrators. However, since the width in many cases is a characteristic feature of a character, and substantially serves to distinguish it from other characters, unlike the height, (such as the letters *i* and *m*, or the figures 1 and 7) such a regulation only appears appropriate in special cases.

An increased and, consequently, higher recognizing reliability will be achieved by expanding the width of the character in dependency upon its height. This is easily possible by means of the expansion method according to FIG. 1. The resistors $R_1 \ldots R_5$ with their respective diodes are used, and the common point of all resistors is coupled via a gating circuit, in analogy to gate 34, to the frequency-determining RC-circuit of the multivibrator, in such a way that the frequency will be increased in the case of a small character. The other controlling arrangements according to FIG. 1 will remain unchanged.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A prescan circuit to be used as a control in an automatic character recognition system which uses light spot scanning and two-coordinate registration comprising means for determining a character length in one direction, means for storing this determination, and means responsive to the store for altering length of a subsequent main scan only in the said one direction to include only the character.

2. A prescan circuit to be used as a control in an automatic character recognition system which uses light spot scanning and row and column registration comprising means for determining a character length in the column direction, means for storing this determination, and means responsive to the store for closing and opening the row ranks of a subsequent main scan commensurate with the character length.

3. A prescan circuit to be used as a control in an automatic character recognition system which uses cathode ray beam scanning and row and column registration and in which the character is scanned vertically in a predetermined number of horizontal rows comprising means for determining a character length in the column direction, means for storing this determination, and means responsive to the store for altering the vertical deflection voltage during the main scan in accordance with the character length whereby regardless of the character size in the said one direction the predetermined number of horizontal rows remains constant.

4. A prescan circuit as claimed in claim 3 in which the means for determining a character length comprises means for scanning a character base in the column wise sense, means for sensing the first portion of a character intercepted, and means responsive to said sensing means for subsequently superposing horizontal deflections on the column scan.

5. A prescan circuit as claimed in claim 4 in which the means for storing the determination of a character length comprises a plurality of bistable storage cells assembled in a shift register, and means for progressively recording the presence of one brightness leap in each horizontal deflection in said register.

6. A prescan circuit as claimed in claim 5, in which the means responsive to the store for altering the vertical deflection voltage comprises a resistor for each cell, a switch in series with each resistor responsive to the state of the associated cell for connecting each resistor through, said resistors being coupled in common to the vertical deflection voltage whereby the resistors connected through effect a corresponding reduction in the deflection voltage.

7. A prescan circuit to be used as a control in an automatic character recognition system which uses cathode ray beam scanning and row and column registration and in which the character is scanned vertically in "*m*" rows, comprising a shift register of "*m*" bistable stages, "*m*" series circuits comprising a resistor and a switch coupled to said stages on a one to one basis, prescanning means for setting those stages of the register corresponding to the rows containing a brightness leap to one state from the other state activating said switches, said resistors being coupled in common to the vertical deflection voltage whereby the activated series circuits effectively reduce the said voltage.

8. A prescan circuit as claimed in claim 7 in which the resistors are so dimensioned and arranged, that each activated resistor reduces the voltage by $1/m$.

9. A prescan circuit as claimed in claim 7, in which the means for setting the stages comprises means for feeding all the row informations to said register progressively, and means for advancing said resister one stage with each row scanned.

10. A prescan circuit as claimed in claim 7 further comprising a scan positioning means, said means comprising a column register of "*m*" bistable stages, "*m*" resistors coupled to said stages on a one to one basis each stage in the upper half of said column being coupled to its associated resistors from one stable state and each stage in the lower half of said column being coupled to its associated resistor from the other stable state, the resistors being coupled in common to the vertical deflection means of the beam, means for representing the extent of the prescanned character in the column direction in said column whereby those bistable stages corresponding to a brightness leap are in the off condition, positive potential means coupled to one stable state of said stages, negative potential means coupled to the other stable state of said stages whereby those stages in the on condition will impress the vertical deflection means with the algebraic sum of their voltages.

References Cited in the file of this patent

UNITED STATES PATENTS

| | | |
|---|---|---|
| 2,838,602 | Sprick | June 10, 1958 |
| 2,877,951 | Rohland | Mar. 17, 1959 |
| 2,894,248 | Relis | July 7, 1959 |